United States Patent
Morichika (10) Patent No.: US 7,129,974 B2
(45) Date of Patent: Oct. 31, 2006

(54) IMAGE PROCESSING SYSTEM, IMAGE PROCESSING METHOD, ELECTRONIC CAMERA, AND IMAGE PROCESSING APPARATUS CAMERA SYSTEM WHICH OBTAIN INFORMATION FOR PERFORMING DISTORTION CORRECTION PROCESSING

(75) Inventor: Kazumasa Morichika, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/965,102

(22) Filed: Oct. 13, 2004

(65) Prior Publication Data
US 2005/0078200 A1    Apr. 14, 2005

(30) Foreign Application Priority Data
Oct. 14, 2003  (JP) ............................. 2003-353622

(51) Int. Cl.
H04N 5/76  (2006.01)
(52) U.S. Cl. ............................. 348/231.99; 348/221.1
(58) Field of Classification Search ........... 348/231.99, 348/231.6, 231.1–3, 221.1
See application file for complete search history.

(56) References Cited

U.S. PATENT DOCUMENTS

| | | | | |
|---|---|---|---|---|
| 5,428,721 A | * | 6/1995 | Sato et al. | 345/650 |
| 5,760,925 A | * | 6/1998 | Saund et al. | 358/497 |
| 5,818,527 A | * | 10/1998 | Yamaguchi et al. | 348/335 |
| 6,219,129 B1 | * | 4/2001 | Kinjo et al. | 355/40 |
| 6,567,126 B1 | | 5/2003 | Slatter et al. | |
| 2001/0035909 A1 | * | 11/2001 | Kubo | 348/232 |
| 2002/0018138 A1 | * | 2/2002 | Yoshiro | 348/232 |

FOREIGN PATENT DOCUMENTS

| | | |
|---|---|---|
| EP | 0 984 319 A1 | 3/2000 |
| EP | 1 067 362 A1 | 1/2001 |
| JP | 2002-354331 A | 12/2002 |
| JP | 2003-289485 | 10/2003 |
| WO | WO 03/083805 A1 | 10/2003 |

* cited by examiner

*Primary Examiner*—Tuan Ho
*Assistant Examiner*—Gevell Selby
(74) *Attorney, Agent, or Firm*—Frishauf, Holtz, Goodman & Chick, P.C.

(57) ABSTRACT

When user gives instruction to perform front photographing correction (keystone distortion correction) while a digital camera displays an image photographed and stored by itself on a monitor in play mode, the digital camera identifies quadrangular contours to be used as correction reference, from the displayed image. The digital camera moves a quadrangular frame to be overlaid upon the identified contours in accordance with user's switching operation, thereby allowing the user to select a desired contour. The digital camera writes coordinate information of four vertexes of the contour selected by deciding operation, in the header of the image file of the displayed image. Thereafter, when front photographing correction is performed on the image by an image processing apparatus, the coordinate information is read from the image file, so that correction is performed based on a quadrangle represented by the coordinate information and having the four vertexes.

10 Claims, 7 Drawing Sheets

IMAGE PROCESSING SYSTEM, IMAGE PROCESSING METHOD, ELECTRONIC CAMERA, AND IMAGE PROCESSING APPARATUS CAMERA SYSTEM WHICH OBTAIN INFORMATION FOR PERFORMING DISTORTION CORRECTION PROCESSING

BACKGROUND OF THE INVENTION

1. Field of the Invention

The present invention relates to an image processing system and image processing method for applying a predetermined process to an image which is photographed and recorded, and an electronic camera and image processing apparatus used therefor.

2. Description of the Related Art

In a case where a document script or the like is photographed by a camera, a so-called keystone distortion occurs in the document script or the like within the image obtained by photographing unless the document script or the like is photographed from a position right in front of it. To deal with this, Patent Document 1 identified below discloses a method for allowing an electronic camera having an imaging element such as a CCD (Charge Coupled Device) or the like, to perform by itself correction (front photographing correction) of a keystone distortion present in a photographed image of a document script or the like, by providing an image processing circuit in the electronic camera.

In a case where an ordinary electronic camera performs such front photographing correction on a photographed image, it requires an enormous time for image processing for the front photographing correction because of limitation of its capacity for image processing. Therefore, front photographing correction on an image photographed by an electronic camera is generally performed with the use of other image processing apparatuses such as a personal computer prepared separately.

[Patent Document 1]

Unexamined Japanese Patent Application KOKAI Publication No. 2002-354331 (see paragraphs [0015] and [0016])

However, in a case where front photographing correction on a photographed image is electronically performed not by an electronic camera but by a personal computer or the like prepared separately, a reference region for front photographing correction, i.e., a correction reference (generally, a quadrangular region) for determining direction and degree of correction has to be placed within the photographed image. Further, such a correction reference has to be set according to the kinds of photographed images (photo object).

Therefore, there is a problem that in a case where a photographed image after being front-photographing-corrected is required, all the tasks required for the front photographing correction has to be performed with the use of a personal computer or the like, causing some sense of inconveniency. This problem becomes significant when many photographed images after being front-photographing-corrected have to be prepared.

SUMMARY OF THE INVENTION

An image processing system according to a first aspect of the present invention includes an electronic camera and an image processing apparatus. The electronic camera includes: an imaging unit which images an object; an image storage unit which stores an image which is imaged by the imaging unit; an obtaining unit which performs line identification of an image stored in the image storage unit, scans a contour of a quadrangular closed shape in the image, and obtains processing information to be used for distortion correction of the image, and a processing information storage unit which stores the processing information obtained by the obtaining unit, in association with the image corresponding to the processing information. The image processing apparatus includes an image processing unit which applies the distortion correction to the image based on the processing information stored by the electronic camera in association with the image.

An electronic camera is provided according to a second aspect of the present invention and includes an imaging unit which images an object, an image storage unit which stores an image which is imaged by the imaging unit, an obtaining unit which performs line identification of an image stored in the image storage unit, scans a contour of a quadrangular closed shape in the image, and obtains processing information to be used for distortion correction of the image, and a processing information storage unit which stores the processing information obtained by the obtaining unit, in association with the image corresponding to the processing information.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
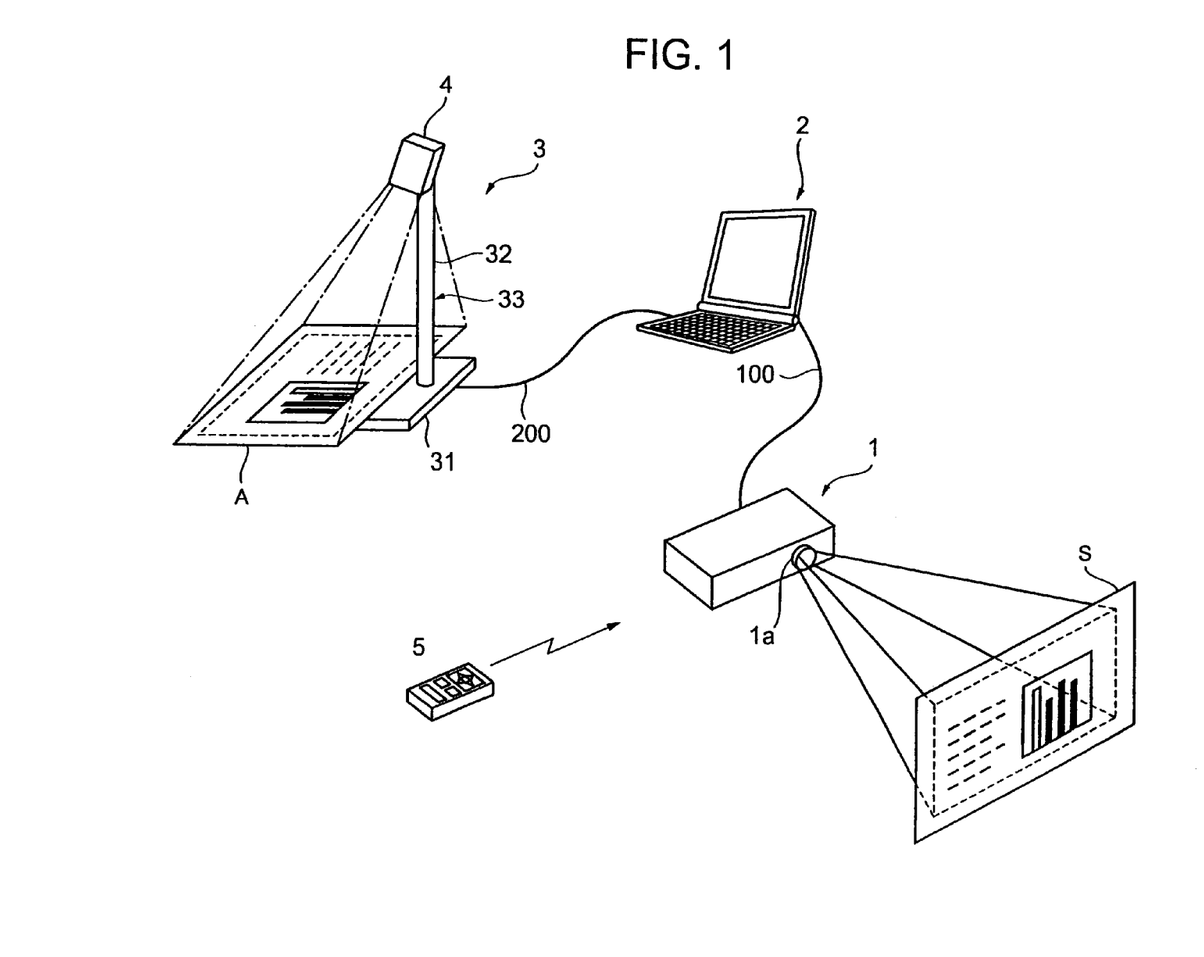
FIG. 1 is a diagram showing configuration of an imaging/projecting system according to the present invention.

One embodiment of the present invention will now be explained with reference to the drawings. FIG. 1 is a diagram showing configuration of an imaging/projecting system including an image processing system according to the present invention.

The present imaging/projecting system comprises a projector 1, a lap-top type personal computer (hereinafter referred to as PC) 2, and a document camera 3. The projector 1 and the PC 2 are connected via an RGB cable 100, and the PC 2 and the document camera 3 are connected via a USB (Universal Serial Bus) cable 200. In the present embodiment, the PC 2 serves as the image processing apparatus according to the present invention.

The projector 1 is structured such that a projection unit 1a containing an optical system such as a projection lens, etc. is provided on the front surface of the projector body. The projector 1 projects a projection light corresponding to an image of a document or the like transmitted from the PC 2, from the projection unit 1a onto a screen S (or a whiteboard, etc.). The projector 1 has an infrared remote control unit 5 as an accessory, with the use of which the projector 1 can be operated from a remote place.

The document camera 3 comprises a stand 33 including a camera stand 31 and a strut 32 standing thereon, and a digital camera 4 which is detachably attached to an unillustrated attachment portion provided rotatably in the up/downward direction and left/rightward direction on the upper end of the strut 32. The digital camera 4 has ordinary specs including an AE function, an AF function, etc., and also has a predetermined photographing mode allowing the digital camera 4 to function as a PC camera that outputs image data acquired by imaging.

The present imaging/projecting system allows a document material A such as a newspaper, a magazine article, a presentation document, a written document, etc. or various kinds of three-dimensional materials to be placed on the camera stand 31 and photographed by the digital camera 4 as illustrated, and allows the photographed image to be transmitted via the PC 2 to the projector 1, so that the document material A is projected on the screen S.

Figure 2:
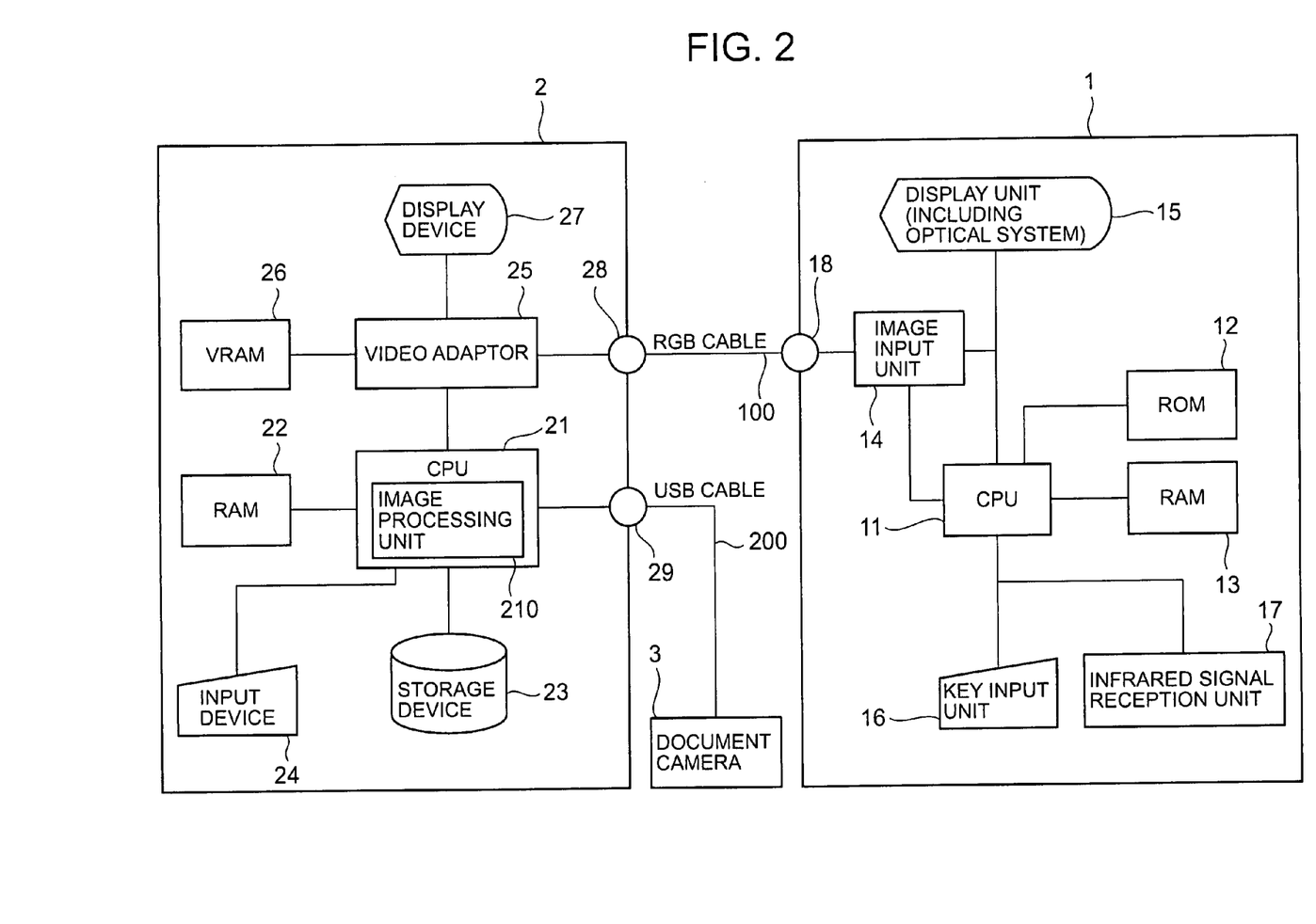
FIG. 2 is a block diagram showing schematic electric configuration of mainly a projector and a PC in the imaging/projecting system.

FIG. 2 is a block diagram showing schematic electric configuration of mainly the projector 1 and the PC 2 in the imaging/projecting system.

(Configuration of Projector)

The projector 1 comprises a CPU (Central Processing Unit) 11, a ROM (Read Only Memory) 12, a RAM (Random Access Memory) 13, an image input unit 14, a display unit 15, a key input unit 16, and an infrared signal reception unit 17. An input terminal 18 to which the above-described RGB cable 100 is connected and from which an RGB signal is input, is connected to the image input unit 14. The image input unit 14 generates a display signal for projecting an image based on an input image signal (RGB signal) input from the PC 2, and sends the display signal to the display unit 15. The display unit 15 includes a light source such as a krypton lamp or the like, an image conversion element (image conversion means of the present invention) such as a liquid crystal, a micromirror array, or the like for converting light from the light source into a projection light corresponding to an input display signal, a drive circuit for driving the image conversion element based on the display signal sent from the image input unit 14, and the optical system such as the projection lens, etc. provided in the projection unit 1a. The display unit 15 projects a display image based on image data sent from the PC 2 onto the screen S.

The CPU 11 operates according to a program stored in the ROM 12 while using the RAM 13 as a work memory, and controls the entire projector 1. The key input unit 16 is constituted by a plurality of operation keys prepared for a user to operate the projector 1. The infrared signal reception unit 17 receives an infrared light sent from the above-described infrared remote control unit 5, decodes an operation signal coded in the received infrared light, and sends the decoded signal to the CPU 11.

(Configuration of PC)

On the other hand, the PC 2 comprises a CPU 21, a RAM 22, a storage device 23, an input device 24, a video adaptor 25, a VRAM (Video Random Access Memory) 26, and a display device 27.

The video adaptor 25 generates a video signal for display (RGB signal) and outputs it to the display device 27 which includes an LCD (Liquid Crystal Display), a drive circuit therefor, etc. The VRAM 26 stores image data for display generated by the video adaptor 25 as needed. The video adaptor 25 is provided with an RGB output terminal 28 to which the above-described RGB cable 100 is connected. The video adaptor 25 outputs image data for display to the projector 1 via the RGB cable 100 in accordance with an instruction from the CPU 21.

An unillustrated USB interface circuit is connected to the CPU 21, and the above-described USB cable 200 is connected to a USB connection terminal 29 provided in the USB interface circuit. Data representing a photographed image that is photographed by the document camera 3 is input to the PC 2 via the USB cable 200.

The input device 24 is constituted by a plurality of keys provided to the body of the PC 2, a mouse connected to the body of the PC 2, etc. The storage device 23 is constituted by a hard disk or the like having a relatively large storage capacity. The storage device 23 stores a predetermined presentation program for generating/editing a presentation document, an image processing program for applying later-described various kinds of image processing to a photographed image, an image display program for controlling the video adaptor 25 to generate image data for display for displaying a document, an image, etc. on the display device 27, and image data to be output to the projector 1, etc.

In the PC 2, the CPU 21 functions as an image processing unit (210) of the present invention, by operating in accordance with the above-described image processing program.

(Configuration of Digital Camera)

Figure 3:
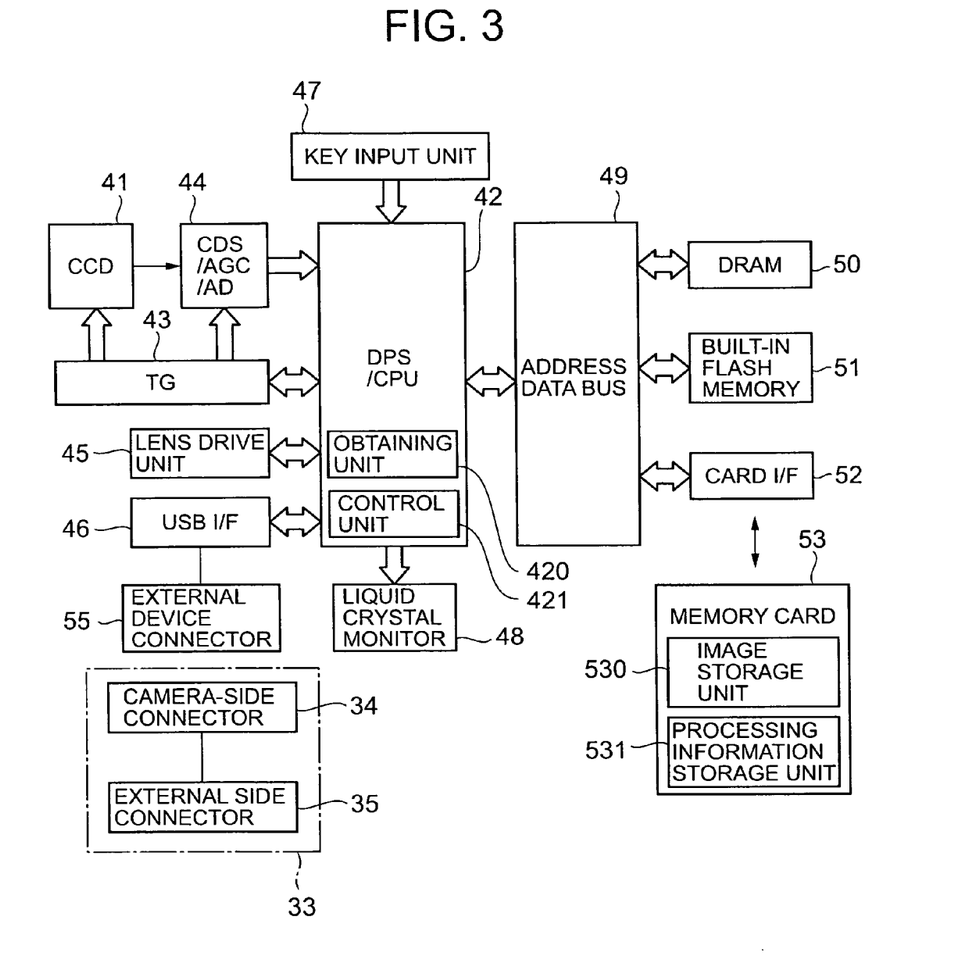
FIG. 3 is a block diagram showing electric configuration of a digital camera.

FIG. 3 is a block diagram showing electric configuration of mainly the digital camera 4 constituting the document camera 3. The digital camera 4 comprises a CCD (imaging unit) 41 which is an imaging element for imaging the document material A, etc., and a DSP (Digital Signal Processor)/CPU 42. The CCD 41 performs opto-electric conversion of an optical image of a photo object that is image-formed via the optical system such as unillustrated focus lens and zoom lens, etc. thereby to output an analog imaging signal corresponding to the optical image of the photo object.

The DSP/CPU 42 is a one-chip microcomputer that performs digital signal processing including compression/decompression of image data according to the JPEG (Joint Photographic Experts Group) method, and controls each unit of the digital camera 4. A TG (Timing Generator) 43 for driving the CCD 41 is connected to the DSP/CPU 42, and a unit circuit 44 to which an imaging signal output from the CCD 41 is input is connected to the TG 43. The unit circuit 44 is constituted by a CDS (Correlation Double Sampling) circuit for eliminating noise from a signal, etc. output from the CCD 41 by correlation double sampling, a gain adjusting amplifier (AGC: Automatic Gain Control) for amplifying the imaging signal from which noise is eliminated, and an A/D converter (AD) for converting the amplified imaging signal into a digital signal. The signal output from the CCD 41 is converted into a digital signal by the unit circuit 44 and sent to the DSP/CPU 42.

Further, a lens drive unit 45, a USB interface 46, a key input unit 47, and a liquid crystal monitor (image display unit) 48 are connected to the DSP/CPU 42, and a DRAM (Dynamic Random Access Memory) 50, a built-in flash memory 51, and a card interface 52 are also connected thereto via an address data bus 49. An external device connector 55 is connected to the USB interface 46, and a memory card 53 which is detachably attached to an unillustrated card slot provided to the camera body is connected to the card interface 52.

The lens drive unit 45 is constituted by a stepping motor for driving the focus lens and zoom lens in the direction of optical axis, and a motor driver for driving the stepping motor in accordance with a control signal sent from the DSP/CPU 42. The key input unit 47 includes various keys such as a switch key for switching operation modes, a zoom key, a menu key, shutter key, etc., and outputs an operation signal corresponding to key operation by the user to the DSP/CPU 42.

The liquid crystal monitor 48 includes a color LCD and a drive circuit therefor. The liquid crystal monitor 48 displays a photo object image imaged by the CCD 41 in the form of a through-image when it is in a photographing waiting mode, and displays a recorded image which is read from the memory card 53 and decompressed by the DSP/CPU 42 when it is in a play mode. Further, for helping user operation, the liquid crystal monitor 48 displays a process menu for function selection, and displays figures, icons, etc. for setting.

The DRAM 50 serves as a buffer for temporarily storing image data of a photo object imaged by the CCD 41 and digitalized, and is also used as a working memory of the DSP/CPU 42. At the time of photographing at which the shutter key is pushed in the photographing waiting mode, image data temporarily stored in the DRAM 50 is compressed by the DSP/CPU 42, and ultimately stored in the memory card 53 in the form of an image file according to a predetermined format (in the present embodiment, a format based on JPEG). The memory card 53 is an image storage unit 530 of the present invention, and at the same time a processing information storage unit 531 of the present invention.

The built-in flash memory 51 stores a control program for allowing the DSP/CPU 42 to control each unit of the digital camera 4, and various data to be used for controlling the digital camera 4. The DSP/CPU 42 functions as an obtaining unit 420 and control unit 421 of the present invention by operating in accordance with the above-described control program.

The stand 33 to which the digital camera 4 is attached, has a camera-side connector 34 at the above-described attachment portion (unillustrated), and has an external side connector 35 at the camera stand 31. The above-described USB cable 200 is connected to the external side connector 35. The digital camera 4 is allowed to perform data communication with the PC 2 via the USB cable 200 with the above-described external device connector 55 connected to the camera-side connector 34 of the stand 33, and is so configured as to transfer image data of a photo object imaged by the CCD 41 and digitalized to the PC 2 each imaging/digitalizing in the above-described predetermined photographing mode.

(Explanation of Operation of Imaging/Projecting System)

Figure 4:
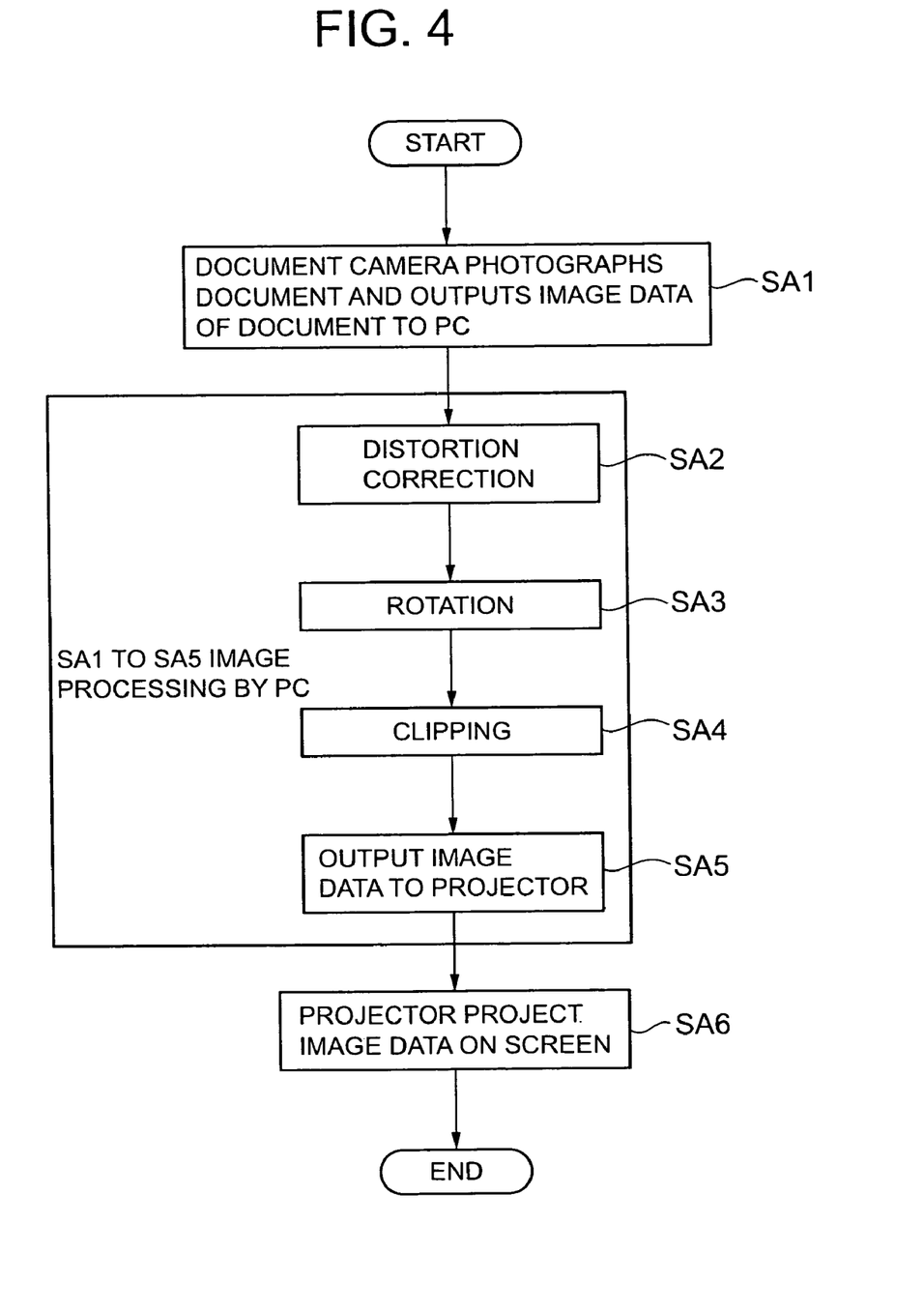
FIG. 4 is a flowchart showing a basic operation of the imaging/projecting system.

Next, an operation according to the present invention, of the imaging/projecting system having the above-described configuration will be explained. FIG. 4 is a flowchart showing an operation to be performed when the predetermined photographing mode for allowing the digital camera 4 to function as a PC camera is set to the digital camera 4 in the state shown in FIG. 1.

The digital camera 4 of the document camera 3 photographs an arbitrary document material A or the like while the predetermined photographing mode is set thereto, and outputs image data of the photographed document to the PC 2 (step SA1). The PC 2 corrects the photographed image by applying various kinds of image processing such as distortion correction processing, rotation processing, clipping processing, etc. to the image data input thereto in accordance with the above-described image processing program, and outputs the processed image data to the projector 1 in accordance with the image display program (steps SA2 to SA5). Then, the projector 1 projects an image based on the image data input from the PC 2 on the screen S (step SA6). The above-described image processing by the PC 2 is performed for a portion of the image or for the entire image according to necessity.

(Explanation of Operation of Digital Camera)

Figure 5:
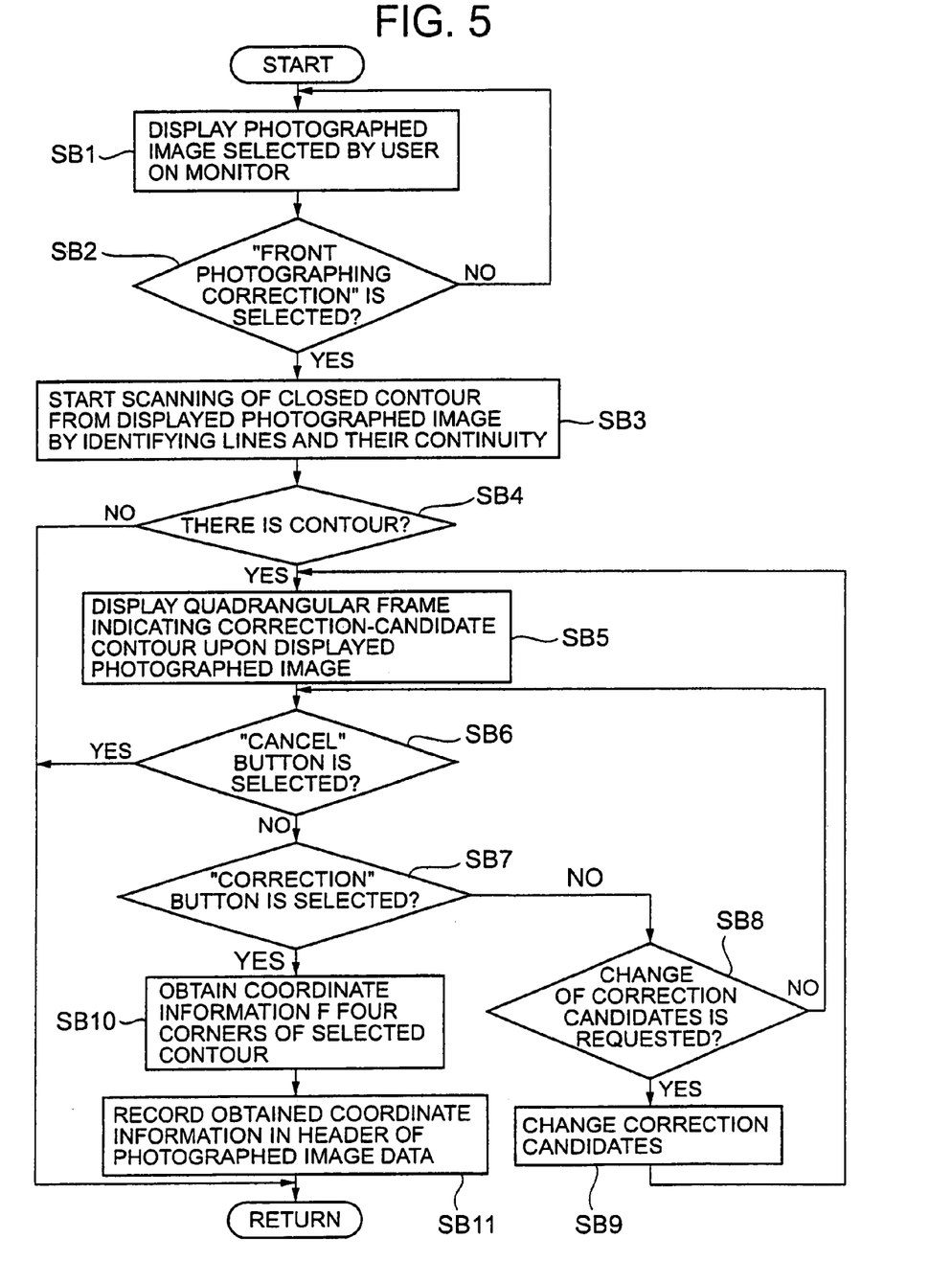
FIG. 5 is a flowchart showing procedures of a process for registering front-photographing-corrected data, which process is performed in a play mode of the digital camera.

FIG. 5 is a flowchart showing procedures of a process for registering front-photographing-corrected data performed when a play mode is set to the digital camera 4. Here, a photographed image G (see FIG. 6) which is obtained when a user uses the digital camera 4 by detaching it from the stand 33 and photographs from an oblique position a whiteboard on which a document and other materials, etc. are projected with comments written thereon by handwriting using a marking pen, is stored in the memory card 53.

In the play mode, the digital camera 4 reads data of a photographed image selected by the user from the memory card 53 in accordance with a predetermined key operation by the user, expands the read data in the DRAM 50, and displays it on the liquid crystal monitor 48 (step SB1). At this time, if the user selects "front photographing correction" from a menu screen prepared in advance, the digital camera 4 goes to the above-described registering process (step SB2: YES). First, the digital camera 4 performs line identification of the photographed image G now being displayed and recognizes continuity of identified lines to scan the contour of a quadrangularly closed shape (step SB3). If there is no contour (step SOB: NO), the digital camera 4 once terminates the registering process. In this case, the digital camera 4 may display a message like "there is no correction object" on the liquid crystal monitor 48.

Figure 6:
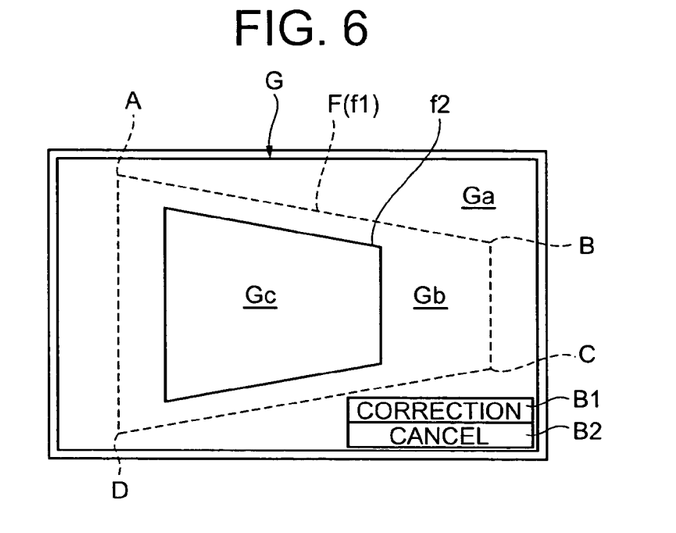
FIG. 6 is a diagram showing a screen displayed on the digital camera when a correction candidate is to be selected.

In a case where there is a contour (step SOB: YES), the digital camera 4 displays a quadrangular frame F, which is a confirmation indicator of the present invention and which indicates the contour which is the correction candidate, upon the photographed image G being displayed, as shown in FIG. 6 (step SB5). At the same time, the digital camera 4 displays a "correction" button B1 and a "cancel" button B2. The shown example illustrates a state where the photographed image G is constituted by regions of mainly a background Ga, a whiteboard Gb, and a projected image Gc, and a contour f1 enclosing the whiteboard Gb and a counter f2 enclosing the projected image Gc are scanned in step SB3, and the contour f1 of the whiteboard Gb is chosen as the correction candidate and the quadrangular frame F is thus displayed upon the contour f1. In this example, the quadrangular frame F is shown by a bold dashed line. However, the quadrangular frame F is actually displayed by a line having a red color, etc.

Then, the digital camera 4 enters a state for waiting for an operation from the user. If the "cancel" button B2 is selected by the user in this waiting state (step SB6: YES), the digital camera 4 terminates the registering process likewise the case where there is no contour. If neither the button B1 nor the button B2 is selected but there is an operation for changing correction candidates by using the zoom key (step SB6: NO, step SB7: NO, step SB8: YES), the digital camera 4 changes the correction candidates (step SB9) and returns to step SB5 to display the quadrangular frame F upon the correction candidate selected by the change. That is, in the example of FIG. 6, a quadrangular frame F that is overlaid upon the contour f2 enclosing the projected image Gc will be displayed. Further, though not illustrated, also in a case where there are a plurality of scanned contours and these contours are positioned side by side, the quadrangular frame F is moved to the respective contours in a predetermined order each time the zoom key is operated.

Figure 7:
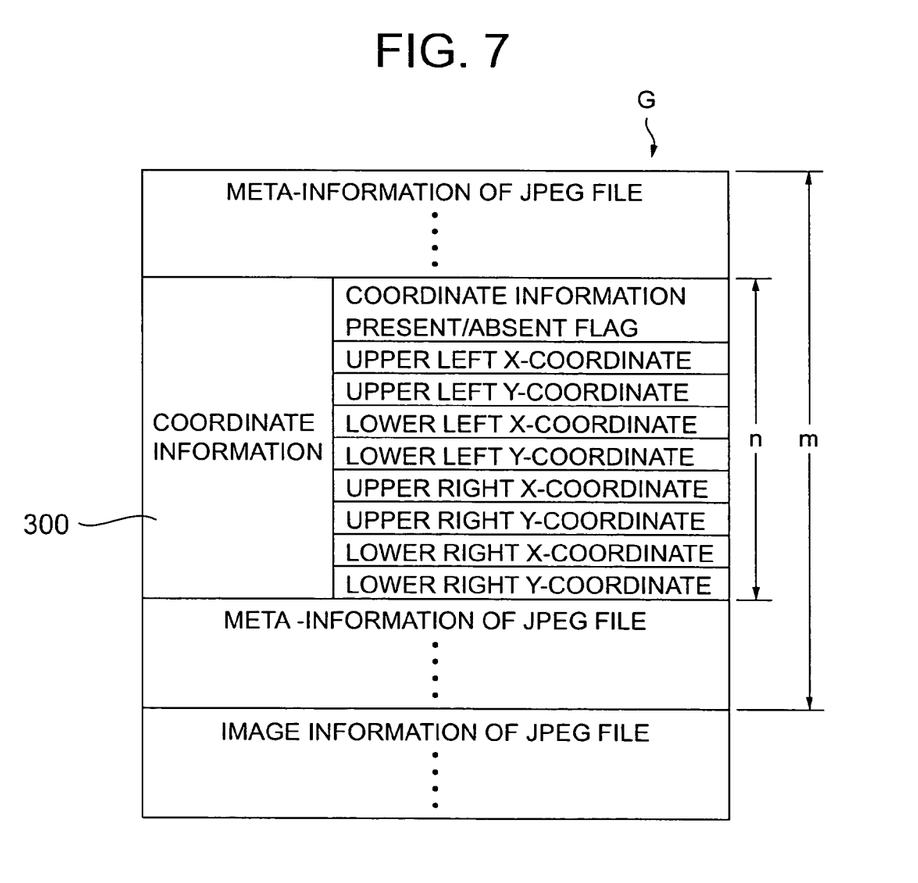
FIG. 7 is an exemplary diagram showing a data structure of an image file in which correction information is registered.

Then, when there is an operation for selecting the "correction" button B1 (a deciding operation) by the user (step SB7: YES), the digital camera 4 obtains coordinate information (data of pixel positions with respect to X and Y directions) 300 of four vertexes A, B, C, and D on the contour indicated by the quadrangular frame F at the time of selection of the correction button B1 (step SB10), records the obtained coordinate information in the header portion of the image data representing the photographed image G (step SB11), and ends the registering process. FIG. 7 is an exemplary diagram showing the structure of data of the photographed image G in which the coordinate information 300 is recorded. The coordinate information 300 is recorded in a user area "n" that is freely usable by the user and secured in a header area "m" in which meta-information other than image information (compressed image data) is stored in a JPEG file.

(Explanation of Operation of PC)

Figure 8:
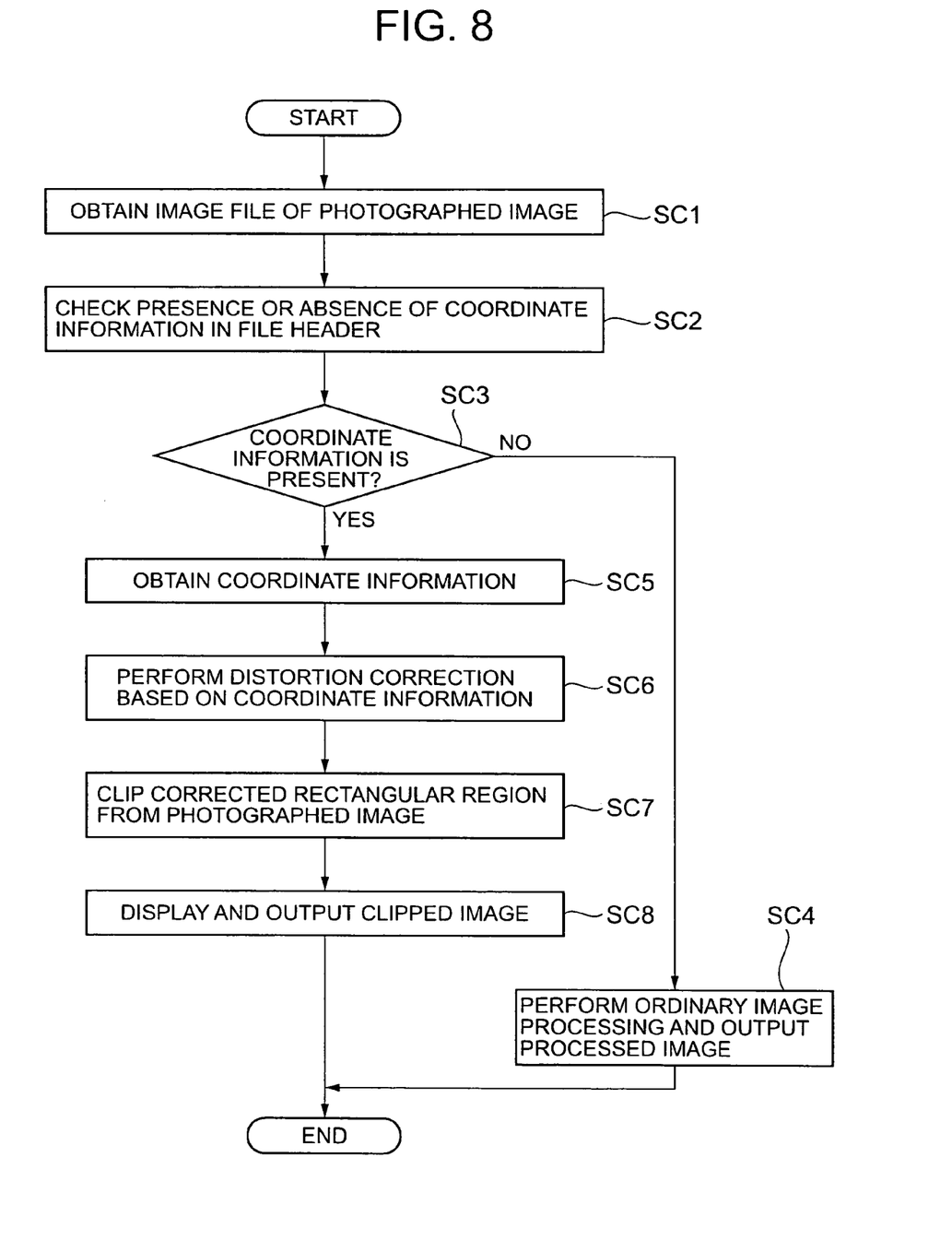
FIG. 8 is a flowchart showing procedures of a front photographing correction process performed by the PC.

FIG. 8 is a flowchart showing procedures of a process relating to front photographing correction performed by the PC 2 when the digital camera 4 is attached to the stand 33 and a predetermined projection control mode for controlling the projector 1 to project a photographed image stored in the digital camera 4 is set to the PC 2 by an operation of the user. This projection control mode is a mode for obtaining thumbnail images or the like of photographed images recorded in the memory card 53 from the digital camera 4 while an image transfer mode is set to the digital camera 4 and for displaying a list of photographed images on the display device 27 thereby allowing the user to select a photographed image to be projected.

When a photographed image is selected by the user in the projection control mode, the PC 2 obtains the image file of the selected photographed image (step SC1), and checks whether the above-described coordinate information 300 is present in the header of the obtained file (step SC2). If no coordinate information 300 is stored (step SC3: NO), the PC 2 performs the ordinary image processing which is described with reference to FIG. 4 and which is performed when the predetermined photographing mode causing the digital camera 4 to function as a PC camera is set to the digital camera 4, and outputs the image data after being image-processed to the projector 1 (step SC4).

To the contrary, if the image file obtained from the digital camera 4 is, for example, the image file of the photographed image G shown in FIG. 6 and the coordinate information 300 is stored in the image file (step SC3: YES), the PC 2 obtains the coordinate information 300 (step SC5), and corrects the distortion in the image based on the coordinate information 300 (step SC6). That is, in a case where data of the four corners A to D of the contour f1 is stored in the header as the coordinate information 300, the PC 2 regards the region enclosed by the contour f1 as a correction reference and performs correction for making the region rectangular. Sequentially, the PC 2 clips the region enclosed by the contour f1 after being transformed (corrected) from the corrected image (step SC7), displays the clipped image on the display device 27, and at the same time, outputs the clipped image to the projector 1 (step SC8).

The following effects can be obtained by using the PC 2 and digital camera 4 described above. That is, in a case where the digital camera 4 of the present embodiment is used for photographing an image to be projected on the screen, the region within a photographed image that is to be distortion-corrected when it is actually projected can be preset while the digital camera 4 is used independently without being attached to the stand 33. That is, this setting operation can be performed immediately after photographing or at any convenient time and even in a case where there is no PC 2 at hand. Accordingly, if there is a need of preparing many images to be projected, this setting feature is helpful. Further, this setting feature is convenient because it makes it possible to pre-select the region to be used with its distortion corrected.

Furthermore, the digital camera 4 makes it possible to check whether distortion correction of a desired region is possible or not immediately after an image is photographed. This is because in the process for registering front-photographing-corrected data which is explained with reference to FIG. 5, a region that cannot be distortion-corrected does not become a correction candidate and this region cannot therefore be set as a correction candidate. Therefore, by performing this check immediately after photographing and by retrying photographing in some case, it is possible to obtain a necessary image without fail.

In the present embodiment, there has been explained a case where the image processing system of the present invention is realized by the PC 2 and the digital camera 4. However, the present invention is applicable to an imaging/projecting system which comprises, for example, only the projector 1 and the digital camera 4 connected to the projector 1. In this case, the above-described process performed by the PC 2 relating to front photographing correction may be performed by the projector 1, so that the projector 1 functions as the image processing apparatus of the present invention.

In the present embodiment, the digital camera 4, which is used as the document camera 3 by being attached to the stand 33 and has a function for transferring a photographed image to the PC 2, has been explained as the electronic camera of the present invention. However, the present invention may be applied to a digital camera (including one that is built in a portable information terminal such as a cellular phone, a PDA (Personal Digital Assistant), etc.) which does not have a function for performing data communication with the PC 2, as long as it is configured to be able to supply its photographed image to the PC 2, etc. via, for example, the memory card 53.

Further, in the present embodiment, there has been explained a case where processing information to be added (registered) to a photographed image is the coordinate information 300 representing the region to be distortion-corrected. However, processing information to be added (registered) to a photographed image may be information that is not used for both of the above-described distortion correction and clipping of a preset region, but is used either one of distortion correction and clipping, or may be information that is to be used for other processing than these.

Furthermore, processing information such as the coordinate information 300 or the like may not necessarily be data that is inseparably integral with data representing a photographed image, but may be data that is recorded in the memory card 53 or the like separately from the photographed image, as long as it is recorded in a state where its association with a corresponding photographed image is recognizable. However, it is more convenient that the coordinate information 300 or the like be inseparably integral with image data (JPEG file) from which the coordinate information 300 is obtained because integral data can more easily be handled by the PC 2.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-353622 filed on Oct. 14, 2003 and including specification, claims, drawings and summary. The disclosure of the above Japanese Patent Application is incorporated herein by reference in its entirety.

What is claimed is:

1. An image processing system comprising:
    (i) an electronic camera which includes:
    an imaging unit which images an object;
    an image storage unit which stores an image which is imaged by the imaging unit;
    an obtaining unit which performs line identification of an image stored in the image storage unit, scans a contour of a quadrangular closed shape in the image, and obtains processing information to be used for distortion correction of the image; and
    a processing information storage unit which stores the processing information obtained by the obtaining unit, in association with the image corresponding to the processing information; and
    (ii) an image processing apparatus including an image processing unit which applies the distortion correction to the image based on the processing information stored by the electronic camera in association with the image.

2. An electronic camera comprising:
    an imaging unit which images an object;
    an image storage unit which stores an image which is imaged by the imaging unit;
    an obtaining unit which performs line identification of an image stored in the image storage unit, scans a contour of a quadrangular closed shape in the image, and obtains processing information to be used for distortion correction of the image; and
    a processing information storage unit which stores the processing information obtained by the obtaining unit, in association with the image corresponding to the processing information.

3. The image processing system according to claim 1, wherein the processing information storage unit and the image storage unit are a same storage unit, and the processing information is stored as information added to the corresponding image.

4. The electronic camera according to claim 2, wherein the processing information obtained by the obtaining unit includes coordinate information which indicates a predetermined region within the image.

5. The image processing system according to claim 3, wherein the processing information obtained by the obtaining unit includes coordinate information which indicates a predetermined region within the image.

6. The electronic camera according to claim 2, further comprising:
    an image display unit which displays the image stored in the image storage unit; and
    a control unit which controls the image display unit to display, together with the image corresponding to the processing information, a confirmation indicator which indicates a content of the processing information obtained by the obtaining unit.

7. The image processing system according to claim 3, wherein the electronic camera further comprises:
    an image display unit which displays the image stored in the image storage unit; and
    a control unit which controls the image display unit to display, together with the image corresponding to the processing information, a confirmation indicator which indicates a content of the processing information obtained by the obtaining unit.

8. The electronic camera according to claim 4, further comprising:
    an image display unit which displays the image stored in the image storage unit; and
    a control unit which controls the image display unit to display, together with the image corresponding to the processing information, a confirmation indicator which indicates a content of the processing information obtained by the obtaining unit.

9. The image processing system according to claim 5, wherein the electronic camera further comprises:
    an image display unit which displays the image stored in the image storage unit, and
    a control unit which controls the image display unit to display, together with the image corresponding to the processing information, a confirmation indicator which indicates a content of the processing information obtained by the obtaining unit; and
    wherein when a plurality of pieces of processing information are obtained by the obtaining unit, the control unit controls the image display unit to display confirmation indicators respectively indicating contents of the plurality of pieces of processing information by switching between the indicators in response to a switching operation of a user, and the control unit stores, in the processing information storage unit, processing information that corresponds to a confirmation indicator that is displayed by the image display unit in response to a deciding operation of the user.

10. A recording medium storing a program to be executed by a computer of an electronic camera that includes an imaging unit to image an object and an image storage unit to store the image, the program being executable by the computer to control the computer to execute:
    performing line identification of an image stored in the image storage unit, scanning a contour of a quadrangular closed shape in the image, and obtaining processing information to be used for distortion correction of the image; and
    storing the processing information in a processing information storage unit in association with the image corresponding to the processing information.

* * * * *